United States Patent [19]
Shimano et al.

[11] Patent Number: 6,145,214
[45] Date of Patent: Nov. 14, 2000

[54] POSITION DETECTION APPARATUS

[75] Inventors: Tadahiko Shimano; Takamoto Yoshioka, both of Kanagawa, Japan

[73] Assignee: Sony Precision Technology Inc., Tokyo, Japan

[21] Appl. No.: 09/274,364

[22] Filed: Mar. 23, 1999

[51] Int. Cl.[7] .................................................. G01B 7/04
[52] U.S. Cl. ...................... 33/706; 33/708; 324/207.24
[58] Field of Search ........................... 33/706, 707, 708; 324/207.2, 207.21, 207.24, 207.11

[56] References Cited

U.S. PATENT DOCUMENTS

| | | | |
|---|---|---|---|
| 4,459,750 | 7/1984 | Affa | 33/708 |
| 4,523,381 | 6/1985 | Narimatsu et al. | 33/706 |
| 5,430,373 | 7/1995 | Ichikawa et al. | 324/207.21 |
| 5,434,602 | 7/1995 | Kaburagi et al. | 33/708 |
| 5,497,083 | 3/1996 | Nakazato et al. | 324/207.24 |
| 5,793,201 | 8/1998 | Nelle et al. | 324/207.2 |

*Primary Examiner*—G. Bradley Bennett
*Attorney, Agent, or Firm*—Jay H. Maioli

[57] ABSTRACT

The present invention provides a position detection apparatus capable of suppressing a crosstalk between a scale signal and an origin signal and detecting a position with a high accuracy. A recording medium 12 of a round bar shape has a magnetic signal alternately reversing the polarity at a predetermined recording wavelength $\lambda_1$ and recorded as a scale signal in the longitudinal direction of the recording medium 12. This scale signal is recorded over the entire outer circumferential surface of the recording medium 12 and almost over the entire length of the recording medium 12. Moreover, the recording medium 12 has a one-wavelength origin signal of recording wavelength $\lambda_2$ recorded at least at one position over the scale signal. The recording wavelength $\lambda_2$ of this origin signal is longer than the recording wavelength $\lambda_1$ of the scale signal. The origin signal is recorded at a part of the outer circumference. An origin signal detection head is arranged to face the origin signal whereas a scale signal detection head is arranged opposite to the origin signal detection head so as to sandwich the recording medium 12.

1 Claim, 7 Drawing Sheets

POSITION DETECTION APPARATUS

BACKGROUND OF THE INVENTION

1. Field of the Invention

The present invention relates to a position detection apparatus for use in controlling position of a movable portion of a machine tool or industrial apparatus and in particular, to a position detection apparatus for detecting a position of a movable portion performing a linear movement.

2. Description of the Prior Art

Conventionally, a so-called position detection apparatus has been used for performing a position control of a movable portion which performs a linear motion.

The position detection apparatus generally includes a main body and a head slider provided in the main body in such a manner that the head slider can move in a linear motion.

In the main body, there is provided, a recording medium shaped, for example, in a round bar, and called "scale". On this scale, a position signal is recorded along the longitudinal direction of the scale. Moreover, the head slider has a detection head for detecting the position signal recorded on the scale. This detection head is, for example, provided at a position facing to this position signal and moves in the longitudinal direction of the scale together with the linear movement of the head slider.

In such a scale apparatus constituted by the main body and the head slider is mounted on a reference block and a movable block of a machine tool performing a relative linear movement. That is, the main body or the head slider is fixed on the reference block, and the other is fixed on the movable block. Here, the main body is mounted in such a manner that the longitudinal direction of the scale is in parallel to the movement of the movable block. Accordingly, in this scale apparatus, as the movable block moves in a linear motion, the relative position between this main block and the head slider is changed.

In this position detection apparatus having the aforementioned configuration, the detection head provided in the slider head detects the position signal changing according to the change of the relative position, so as to control the position of the movable position.

In the position detection apparatus, a scale signal and an origin signal are recorded as the position signal in the longitudinal direction of the scale.

The scale signal has a pit and mark successively repeated at a predetermined interval in the longitudinal direction of the scale. For example, the scale signal is a magnetic signal in which polarity is inversed at a predetermined recording wavelength. By using the scale having such a scale signal, it is possible to linearly detect a change of relative movement position between the main body and the slider, so as to continuously control the relative position between the reference block and the movable block.

The origin signal is a signal in which at least one pit or mark is discretely recorded in the longitudinal direction of the scale. For example, one-wavelength magnetic signal is recorded at a predetermined one position in the longitudinal direction of the scale. By using the scale having such an origin signal, the position detection apparatus can detect a reference position such as an initial setting position and an origin position of the main body and the head slider, so as to set the relative position of the reference block and the movable block at the reference position.

In a machine tool or the like performing an NC (numerical control) feed back, it is necessary to control a relative movement amount of the movable block as well as to move the movable block to a reference position. For this, the machine tool performing such an NC feed back requires a position detection apparatus having a built-in scale on which two signals, i.e., a scale signal and an origin signal are recorded.

The position detection apparatus having a built-in scale having a scale signal and an origin signal recorded includes a detection head for detecting the scale signal and a detection head for detecting the origin signal. Each of the heads detects only a corresponding signal for supply to a control apparatus for driving-controlling the machine tool.

However, in such a position detection apparatus, when two signals of a scale signal and an origin signal are recorded on one scale, a crosstalk is generated between the two signals, deteriorating signals detected from the respective detection heads.

As the built-in scale becomes smaller for reduction of the size of the position detection apparatus, the crosstalk between the two signals has a greater effect, making it difficult to eliminate the effect.

SUMMARY OF THE INVENTION

It is therefore an object of the present invention to provide position detection apparatus that can suppress the crosstalk between the scale signal and the origin, enabling to obtain a position detection of high accuracy.

The position detection apparatus according to the present invention comprises: a round bar-shaped recording medium having a scale signal of a predetermined recording wavelength recorded over the entire outer circumferential surface of the recording medium and successively repeated in the longitudinal direction, and an origin signal of a greater recording wavelength than the scale signal recorded at a part of the outer circumference at least at one position in the longitudinal direction; scale signal detection head that moves relatively in the longitudinal direction of the recording medium while maintaining a predetermined distance from the outer circumference of the recording medium and detects the scale signal; and an origin signal detection head that moves relatively in the longitudinal direction of the recording medium while maintaining a predetermined distance from the outer circumference which distance is greater than the distance from the outer circumference of the recording medium to the scale signal detection head and that detects the origin signal; wherein the scale signal detection head is located at a position not facing the origin signal and the origin signal detection head is located at a position facing the origin signal recorded on the recording medium.

In this position detection apparatus, the scale signal detection head and the origin signal detection head relatively move in a direction parallel to the longitudinal direction of the recording medium so as to detect a relative position with respect to the recording medium. That is, in this position detection apparatus, the scale signal recorded over the entire outer circumferential surface of the recording medium is detected by the scale signal detection head so as to detect a relative position with respect to the recording medium. Moreover, the origin signal is recorded with a greater recording wavelength than that of the scale signal at a part of the outer circumference of the recording medium, which origin signal is detected by the origin signal detection head arranged at a greater distance than the scale signal detection head from the outer circumference of the recording medium than the scale signal detection head, thus detecting a relative movement position with respect to the recording medium.

DETAILED DESCRIPTION OF PREFERRED EMBODIMENTS

Hereinafter, description will be directed to a position detection apparatus according to an embodiment of the present invention with reference to the attached drawings.

Figure 1:
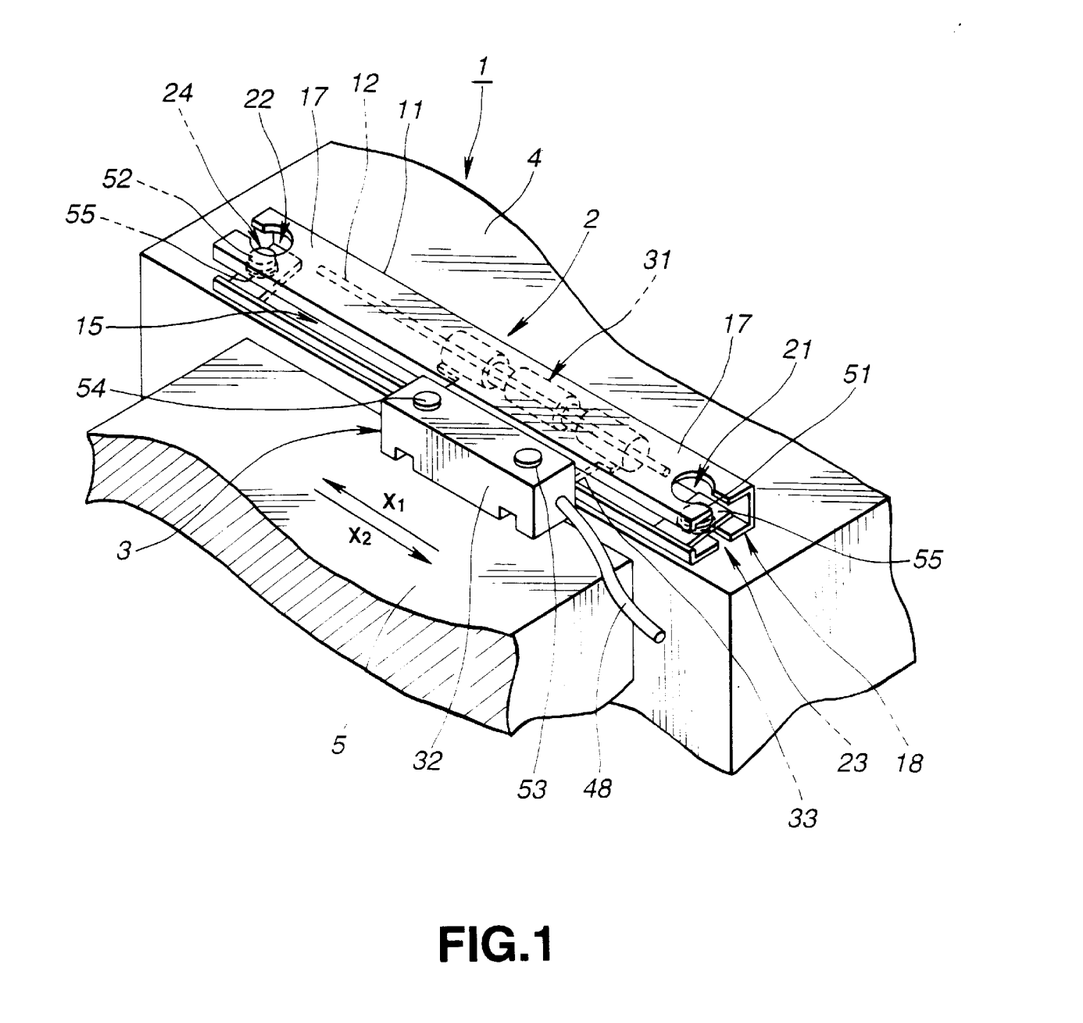
FIG. 1 is a perspective view of a position detection apparatus according to an embodiment of the present invention.
Figure 2:
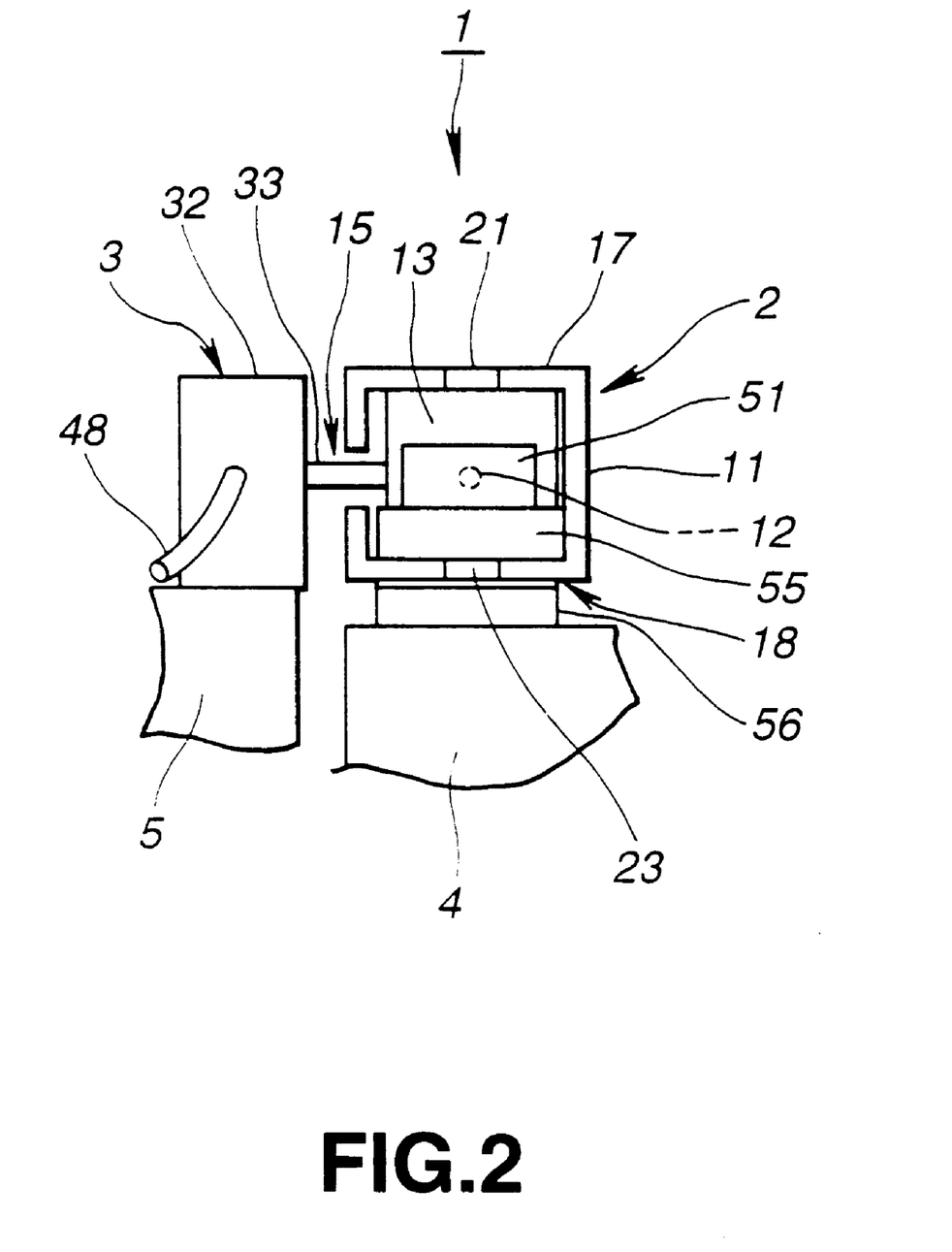
FIG. 2 is a side view of the position detection apparatus.
Figure 3:
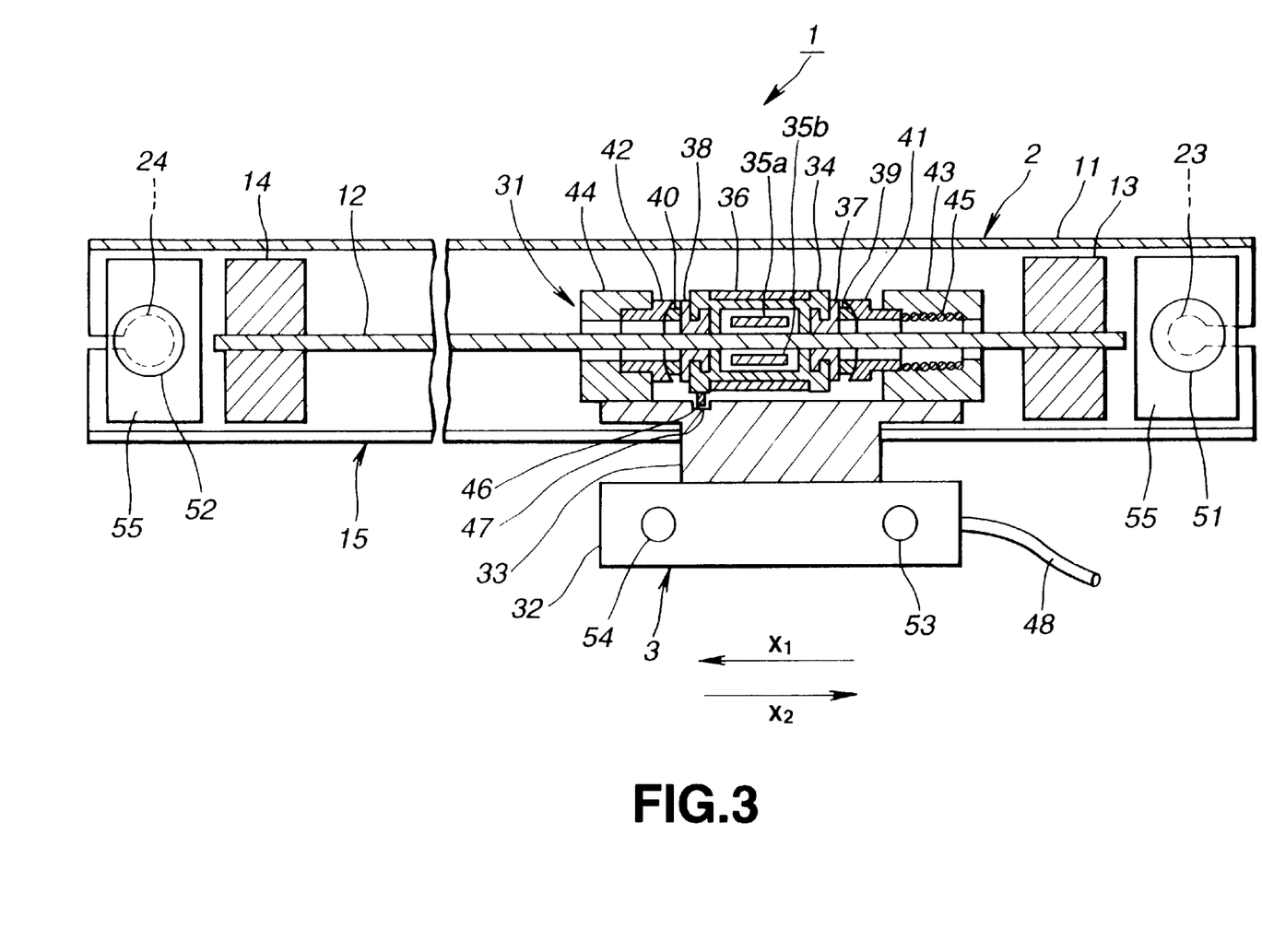
FIG. 3 is a cross sectional view of the position detection apparatus for showing an internal configuration.

FIG. 1 is a perspective view of the position detection apparatus according to the embodiment of the present invention. FIG. 2 is a side view of this position detection apparatus. FIG. 3 is cross sectional view of this scale apparatus, showing in internal configuration of the position detection apparatus.

The position detection apparatus 1 according to the embodiment of the present invention includes: a main body 2 and a head slider 3 mounted on this main body.

The position detection apparatus 1 is used to detect a relative position of two members constituting a machine tool and moving along a straight line relatively to each other. For example, the scale apparatus 1 detects a reference block 4 provided at a predetermined fixed position and a position of a movable block 5 moving in the direction of $X_1$ and $X_2$ with respect to this reference block 4. In this position detection apparatus 1, one the main body 2 and the head slider 3 is mounted on the reference block 4 and the other is mounted on the movable block 5. FIG. 1 and FIG. 2 show an example in which the main body 2 is mounted on the reference block 4 and the head slider 3 is mounted on the movable block 5.

The main body 2 is a recording medium consisting of a frame 11 and a round bar-shaped recording medium made from a material having a high coercive force. In side the frame 11, there is provided a scale 12 whose two ends are held by brackets 13, 14, so that the two ends are fixed at predetermined positions in the frame 11. It should be noted that for simplification of the drawing, FIG. 1 does not depict the brackets 13 and 14.

The frame 11 has, for example, a hollow parallelepiped having one side with a slit 15 formed. Moreover, the frame 11 has frame mounting holes of approximately circular shape 21, 22, 23, 24 at the ends in the longitudinal direction of the side faces 17, 18 vertically intersecting the side faces having the slit 15.

The scale 12 is held through the brackets 13, 14 and fixed inside the frame 11. The scale 12 is arranged in parallel to the longitudinal direction of the frame 11 and on the center axis of the parallelepiped. Moreover, a scale signal and an origin signal are recorded as the position signal on this scale 12. The scale signal and the origin signal will be detailed later.

Moreover, the head slider 3 includes: a head holder block 31 provided inside the main body; a head carrier 32 provided outside the main body 2; and a linkage block 33 for linking the head holding block 31 to the head carrier 32. The head slider 3 is mounted in such a manner that the head slider 3 can move in the longitudinal direction of the scale 12.

Figure 4:
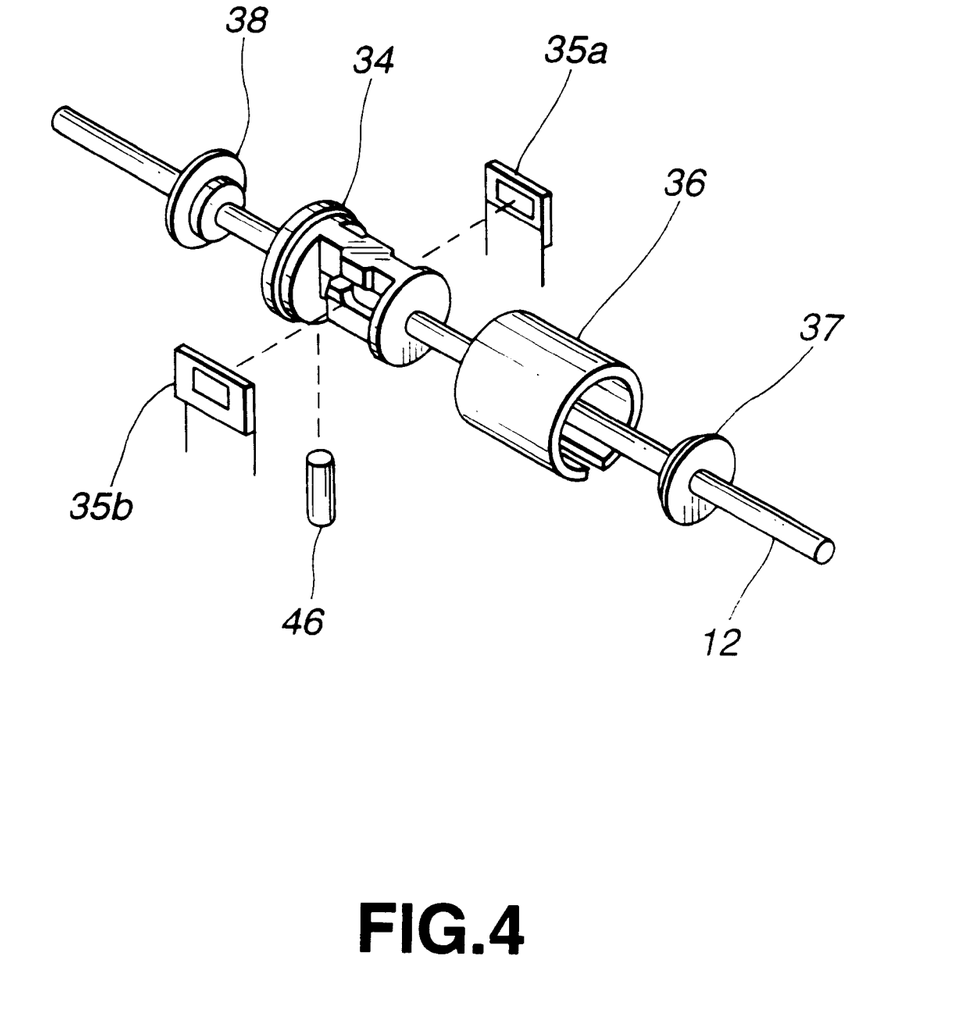
FIG. 4 is an exploded perspective view of a head holding block of the position detection apparatus.

FIG. 4 is an exploded perspective view of the essential portion of this head holder 31.

The head holding block 31 has a head holder 34. This head holder 34 has an insert hole for the scale 12. The scale 12 in inserted into this insert hole so that the head holder 34 is mounted on the scale 12 in such a manner that the head holder 34 car move in the longitudinal direction of the scale 12.

The head holder 34 is covered by a head holder case 36 and has an MR head 35a for the scale signal and an MR head 35b for the origin signal. The scale signal MR head 35a detects the scale signal recorded on the scale 12., Moreover, the origin signal MR head 35b detects the origin signal recorded on the scale 12. The scale signal MR head 35a and the origin signal MR head 35b are respectively held on the head holder 34, so that they move together with the head holder 34 in the longitudinal direction of the scale 12. The positional arrangements of the scale signal MR head 35a and the origin signal MR head 35b with respect to the scale 12 will be detailed later.

At the two ends of head holder 34, there is provided a pair of slide support members 37, 38 in the longitudinal direction of the scale 12. Each of the slide support members 37, 38 has an approximately cylindrical form having an insert hole for inserting the scale 12. When the scale is inserted in the insert holes, the slide support member 37, 38 are slidably supported on this scale 12. Moreover, when the head holder 34 is moved in the longitudinal direction of the scale 12, the slide support member 37, 38 prevent the head holder 34 from moving in a direction vertically intersecting the sliding direction.

Moreover, the head holding block 31 has a pair of first spacers 39, 40 and a pair of second spacers 41, 42.

The pair of first spacers 39, 40 has an insert hole for inserting the scale 12. When the scale 12 is inserted through the holes, the pair of first spacers 39 and 40 are moved on the scale 12 in such a way that they can move in the longitudinal direction of the scale 12. Moreover, the pair of first spacers 39, 40 is in abutment with one end face of the slide support members 37, 38.

Moreover, each of the second spacers 41, 42 has a hole for inserting the scale 12. When the scale 12 is inserted in the holes, the spacers 41, 42 are mounted on the scale 12 in such a manner that the spacers 41, 42 can move in the longitudinal direction of the scale 12. Moreover, the spacers 41, 42 are in abutment with one end face of the first spacers 39, 40 not in abutment with the slide support members 37, 38.

Moreover, the head holding block 31 has a pair of head holder sandwiching members 43, 44 and a spring 45.

Each of the head holder sandwiching members 43, 44 has an insert hole for inserting the scale 12. When the scale 12 is inserted into the holes, the head holder sandwiching members 43, 44 are mounted on the scale 12 in such a manner that the sandwiching members 43, 44 can move in the longitudinal direction of the scale 12. Moreover, the head holder sandwiching members 43, 44 are fixed to the linkage block 33. This pair of sandwiching members 43, 44 sandwiches the head holder 34 having the slide support members 37, 38, via the first spacers 39, 40 and the second spacers 41, 42 in the longitudinal direction of the scale 12. Moreover, the spring 45 is arranged between the head holder sandwiching member 43 and the spacer 41. This spring, 45 urges the head holder 34 in the direction from the head holder sandwiching member 43 to the head holder sandwiching member 44.

Moreover, a rotation preventing pin 46 is provided in the head holder 34. This rotation preventing pin 46 has one end fixed to the head holder 34 and the other end inserted into a rotation regulating hole 47 provided in the linkage block 33. This regulates the rotation of the head holder 34 around the scale 12.

Moreover, the first spacers 39, 40 and the second spacers 41, 42 are in abutment with a spherical abutment surface. When the head holder sandwiching members 43, 44 are displaced in a direction vertically intersecting the scale 12, the spherical abutment surfaces function to reduce the bending moment applied from the slide support members 37, 38 to the scale 12.

As has been described above, the head holding block 31 is mounted on the scale 12 iri such a manner that the head holding block 31 can move in the longitudinal direction of the scale 12. According to this movement, the scale signal MR head 35a and the origin signal MR head 35b detect the position signal and the origin signal recorded on this scale 12.

This head holding block 31 is linked to the head carrier 32 via the linkage block 33. This linkage block 33 has one end fixed to the head holder sandwiching members 43, 44 and the other end extruding from the slit 15 so as to be fixed by the head carrier 32 provided outside the main body 2.

Thus, the head slider 3 is constituted by the head holding block 31, the head carrier 32, and the linkage block 33, and mounted on the main body 2 in such a manner that the head slider 3 can move in the longitudinal direction of the scale 12. The scale signal and the origin signal detected by the scale signal MR head 35a and the origin signal MR head 35b according to the relative movement with respect to the main body 2 are supplied via a signal cable 48 provided in the head carrier 32 to a control apparatus (not depicted).

In the position detection apparatus 1 having the aforementioned configuration, the scale 12 is parallel to the relative movement between the reference block 4 and the movable block 5 and the slit 15 opens at the side of the movable block 5. In the scale apparatus 1 thus arranged, the main body 2 is mounted using as the mounting surface one of the side faces not having the slit 15. The main body 2 is fixed to the reference block 4 with fixing members such as main body bolts 51, 52 and the washer 55 at the position of the frame mounting holes 21, 22, 23, 24 provided at the ends of the frame in the longitudinal direction of the scale 12. Moreover, the head slider 3 of the position detection apparatus 1 is fixed to the movable block 5 with slider bolts 53, 54.

Accordingly, in this position detection apparatus 1, the relative position between the main body 2 and the head slider 3 is changed according to the linear movement of the movable block 5. The scale signal and the origin signal changing according to this relative position are detected by the scale signal MR head 35a and the origin signal MR head 35b provided in the head slider 3, thus detecting the moving position of the movable block 5.

Next, explanation will be given on the scale signal and the origin signal recorded on the scale 12.

The scale signal has a pit and mark successively repeated at a predetermined internal in the longitudinal direction of the scale 12. For example, the scale signal is a magnetic signal in which polarity is inversed at a predetermined recording wavelength. By using the scale 12 having such a scale signal, it is possible to linearly detect a change of relative movement position between the main body 2 and the slider 3, so as to continuously control the relative position between the reference block 4 and the movable block 5.

Figure 5:
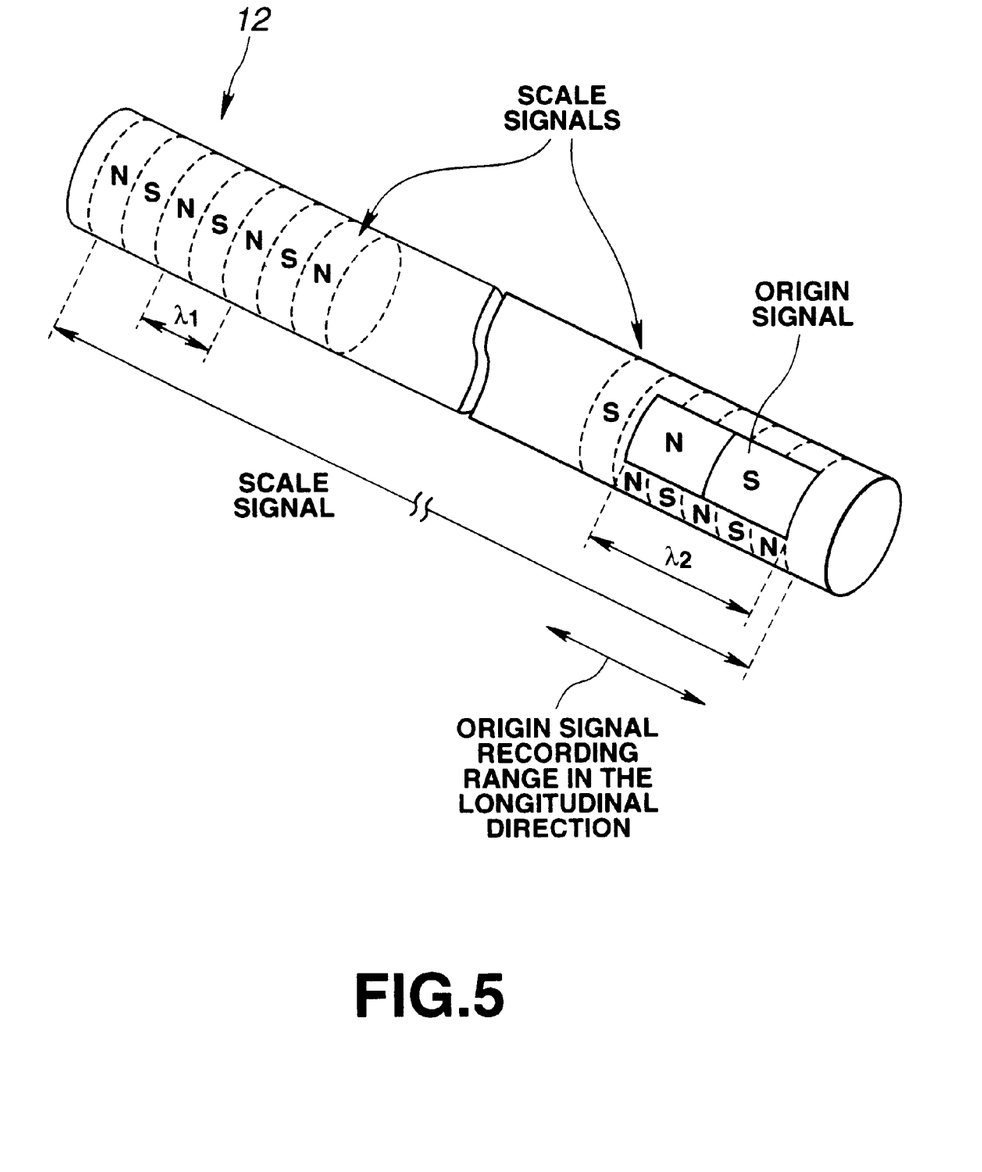
FIG. 5 is for use in explaining a scale signal and an origin signal recorded on a scale of the position detection apparatus.

More specifically, on the scale 12 of the position detection apparatus 1, as shown in FIG. 5, a magnetic signal alternately reversing the polarity at a predetermined recording wavelength $\lambda_1$ is recorded along the longitudinal direction. This scale signal is recorded on the entire outer circumference of the round bar shape of the scale 12. Moreover, this scale signal is recorded almost over the entire length of the scale 12 in the longitudinal direction.

The origin signal is a signal in which at least one pit or mark is discretely recorded in the longitudinal direction of the scale 12. For example, one-wavelength magnetic signal is recorded at a predetermined one position in the longitudinal direction of the scale 12. By using the scale 12 having such an origin signal, the position detection apparatus 1 can detect a reference position such as an initial setting position and an origin position of the main body 2 and the head slider 3, so as to set the relative position of the reference block 4 and the movable block 5 at the reference posit ion.

More specifically, on the scale 12 of the position detection apparatus 1, as shown in FIG. 5, one-wavelength origin signal of recording wavelength $\lambda_2$ is recorded as the origin signal at least at one position over the aforementioned scale signal. The recording wavelength $\lambda_2$ of this origin signal is longer than the recording wavelength $\lambda_1$ of the scale signal, for example, by two times or more. Moreover, this origin signal is recorded at a certain portion of the outer circumference of the round bar shape of the scale 12. For example, the origin signal is recorded on an area of the outer circumference in the range of about 60 degrees of the center angle.

The scale signal can be compared to the origin signal as follows.

The recording wavelength $\lambda_2$ of the origin signal is longer than the recording wavelength $\lambda_2$ of the scale signal, for example, by twice or more. The scale signal is a magnetic signal alternately reversing the polarity and recorded almost over the entire length of the scale 12 in its longitudinal direction, whereas the origin signal is a one-wavelength magnetic signal discretely recorded at least one position in the longitudinal direction of the scale. Moreover, the scale signal is a signal recorded over the entire outer circumference of the round bar shape of the scale 12, i.e., over 360 degrees of the center angle, whereas the origin signal is recorded only at a certain area of the outer circumference, for example, in a range of 60 degrees of the center angle.

Next, explanation will be given on the positional arrangement of the scale signal MR head 35a detecting the scale signal and the positional arrangement of the origin signal MR head 35b detecting the origin signal.

As has been described above, the scale signal MR head 35a and the origin signal MR head 35b are held by the head holder 34 mounted on the scale 12.

Figure 6:
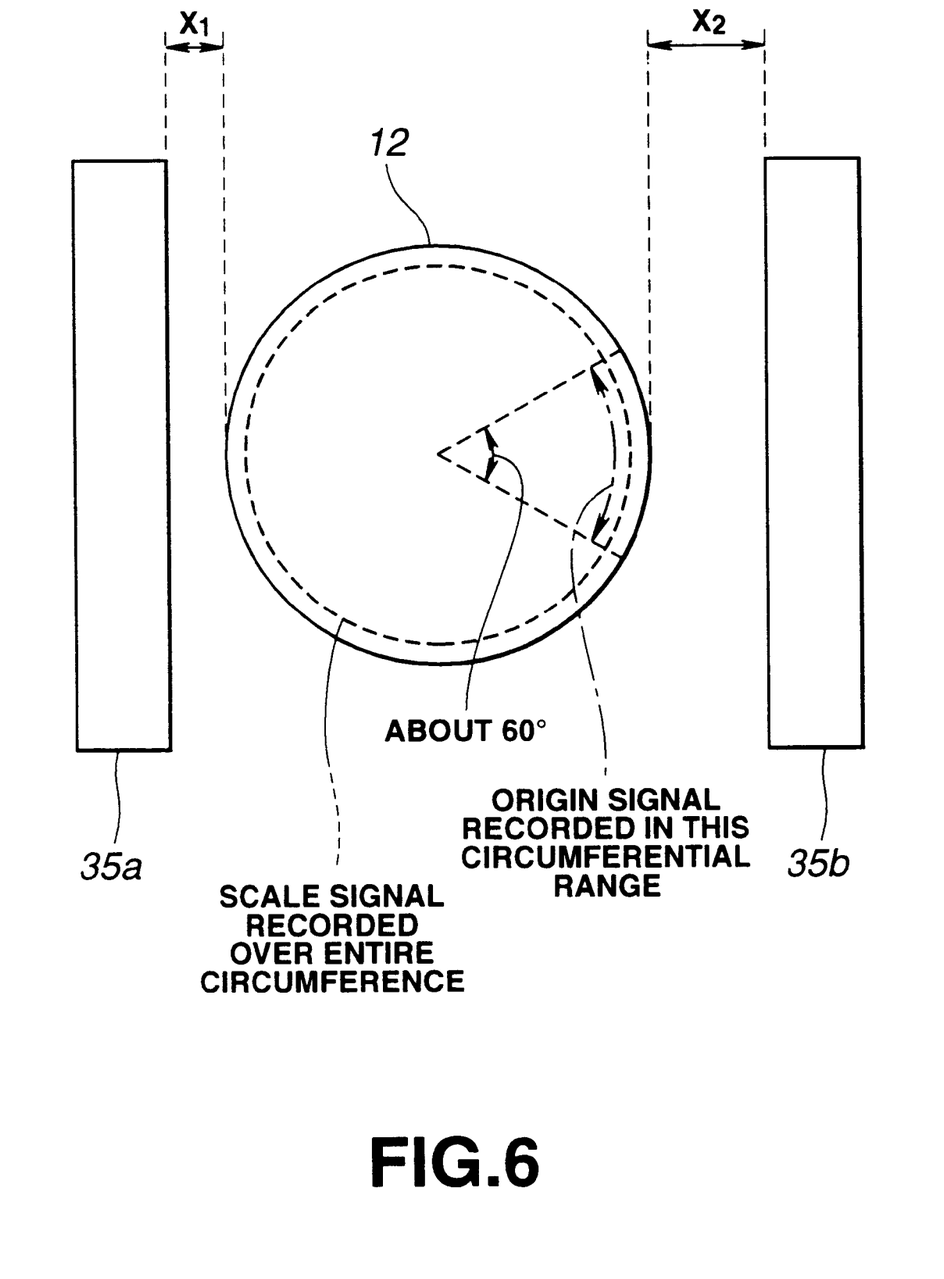
FIG. 6 shows a positional relationship between the scale having the scale signal and the origin signal recorded and a scale signal MR head and an origin signal MR head.

As shown in FIG. 6, the origin signal MR head 35b is arranged so as to face the origin signal recorded on a part of the outer circumference of the scale 12 when the origin signal MR head 35b has moved in a direction parallel to the longitudinal direction of the scale 12. That is, the origin signal MR head 35b is arranged at a position to face the area of 60-degree center angle of the scale 12.

The scale signal MR head 35a is positioned in such a way, for example, that the scale 12 is sandwiched between the scale signal MR head 35a and the origin signal MR head 35b.

Here, the scale signal MR head 35a is positioned at a distance $x_1$ from the outer circumference of the scale 12. This distance $x_1$ is determined according to a material and radius of the scale 12, so as to obtain a sufficient detection output. Moreover, the origin signal MR head 35b is positioned at a distance $x_2$, which is greater than the distance $x_1$, from the scale 12. For example, the distance $x_2$ between the scale 12 and the origin signal MR head 35b is twice of the distance $x_1$ between the scale 12 and the scale signal MR head 35a.

The scale signal MR head 35a and the origin signal MR head 35b thus arranged are held by the head holder 34 that as a pair of slide support member 37, 38 at both ends in the longitudinal direction of the scale 12. This enables the head holder 34 to move the scale signal MR head 35a and the origin signal MR head 35b without causing a positional deflection in a vertical direction to the longitudinal direction of the scale 12. Moreover, as has been described above, the head holder 34 has the rotation preventing pin 46. This rotation preventing pin 46 regulates rotation of the head holder 34 around the scale 12. This enables the origin signal MR head 35b to be maintained always at a position opposing to the side surface along a part of the outer circumference of the scale 12 where the origin signal is recorded.

The scale signal MR head 35a is positioned at an appropriate distance for sufficiently detecting the scale signal and arranged so as to oppose the area of the outer circumference of the scale 12 having no origin signal recorded. Accordingly, the scale signal MR head 35a can detect the scale signal recorded on the entire outer circumference of the scale 12 without being affected by the origin signal.

Moreover, the origin signal MR head 35b is arranged at a position facing the area of the outer circumference of the scale 12 having the origin signal recorded and at a greater distance from the outer circumference of the scale 12 than the scale signal MR head 35a, so that the scale signal is attenuated. Here, the scale 12 has the origin signal recorded with a longer recording wavelength than the recording wavelength of the scale signal. Consequently, on the basic theory of the so-called magnetic spacing loss that "the shorter the recording length (wavelength) the greater the spatial magnetic attenuation", the origin signal MR head 35b can detect the origin signal without being affected by the scale signal.

As the scale signal MR head 35a and the origin signal MR head 35b are thus arranged in the position detection apparatus 1, it is possible to suppress the crosstalk, enabling to detect a high-quality scale signal and origin signal.

Figure 7:
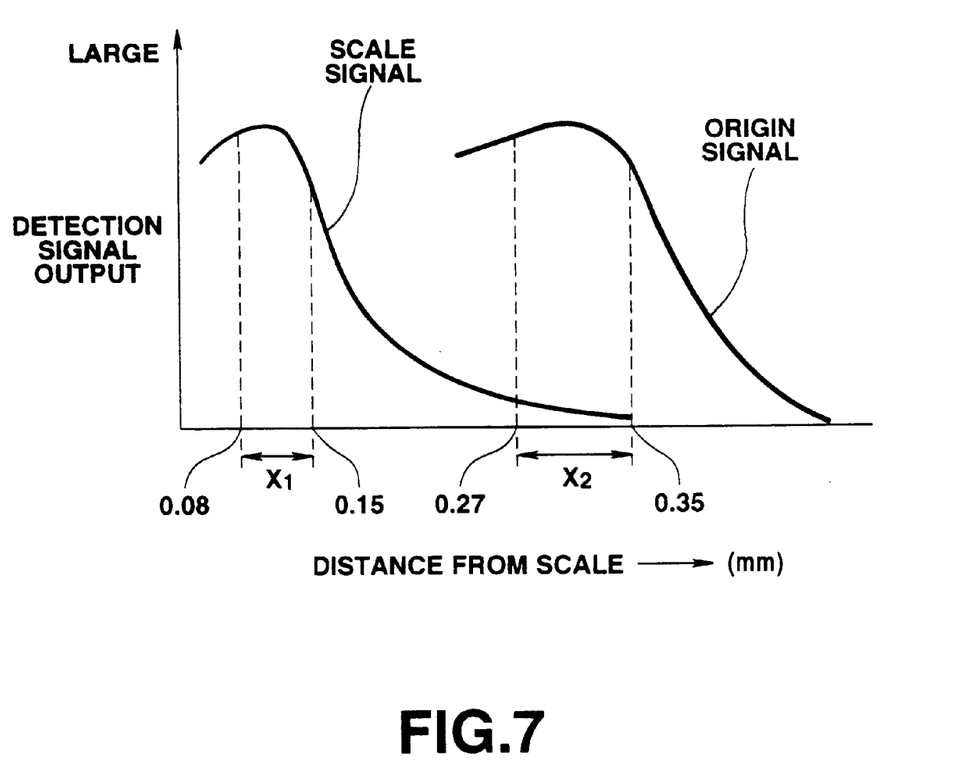
FIG. 7 shows output characteristics of the scale signal MR head and the origin signal MR head in accordance with a distance from the scale under a conditions: the scale is made from a magnetic metal member having a diameter of 2 mm; the scale signal recording wavelength is set to 0.4 mm; and the origin signal recording wavelength is set to 1 mm.

FIG. 7 shows output characteristics of the scale signal MR head 35a and the origin signal MR head 35b according to a distance from the scale 12, under the conditions that: the scale 12 employs a magnetic metal member having a diameter of 2 mm; the scale signal recording wavelength $\lambda_1$ is set to 0.4 mm; the origin signal recording wavelength $\lambda_2$ is set to 1 mm.

The scale signal MR head 35a is arranged at a position not affected by the origin signal. Accordingly, what is necessary for the position of the scale signal MR head 35a is to be at a distance capable of obtaining a sufficiently large detection output. Under the condition satisfying such an output characteristic, the distance between the scale signal MR head 35a and the scale 12 can be set in a range from 0.08 mm to 0.15 mm.

On the other hand, the scale signal is recorded also on the scale signal. If the distance between the origin signal MR head 35b and the scale 12 is set in a supersaturated area where the output characteristic is stabilized, the ratio of the scale signal with respect to the origin signal becomes too large, disabling to suppress the crosstalk. Accordingly, the origin signal MR head 35b is arranged at a position detecting a sufficient origin signal and not affected by the scale signal. Under the condition enabling to obtain this output characteristic, the distance between the origin signal MR head 35b and the scale 12 can be set in a range from 0.27 to 0.35 mm.

By setting the distance between the scale signal MR head 35a and the origin signal MR head 35b in this way, it is possible to detect a preferable scale signal and origin signal without being affected by each other.

It should be noted that the recording wavelength of the origin signal recorded on the scale 12 differs depending on the detection sensitivity of the scale signal MR head 35a and that of the origin signal MR head 35b. For example, the recording wavelength of the origin signal is preferably set 1.5 to 10 times greater and more preferably, 2 to 4 times greater.

Moreover, in the position detection apparatus 1, the scale signal MR head 35a and the origin signal MR head 35b are positioned so as to sandwich the scale 12. That is, the scale signal MR head 35a and the origin signal MR head 35b are positioned at 180 degrees, assuming the center axis of the scale 12 as the center. However, the scale signal MR head 35a and the origin signal MR head 35b may be positioned at an angle other than 180 degrees if the scale signal MR head 35a is not affected by the origin signal. For example, when the origin signal is recorded in an area of 60-degree center angle (±30 degrees), the arrangement with +45-degree angle around the center axis of the scale 12 is sufficient for not being affected.

In the position detection apparatus according to the present invention, the scale signal detection head detects the scale signal recorded around the entire circumferential surface of a recording medium, so as to detect a relative position with respect to the recording medium. Moreover, in this position detection apparatus, the origin signal detection head is provided at a greater distance than the scale signal detection head from the outer circumference of the recording medium and detects the origin signal which has been recorded with a greater recording wavelength than that of the scale signal over a part of the outer circumference of the recording medium, so as to detect a relative movement position with respect to the recording medium.

This enables the position detection apparatus according to the present invention to suppress the crosstalk between the scale signal and the origin signal and to detect the scale signal and the origin signal with a high accuracy. Accordingly, this position detection apparatus can accurately detect the relative movement position between the reording medium and the respective detection heads.

Moreover, this position detection apparatus can suppress the crosstalk between the scale signal and the origin signal without requiring a complicated detection circuit or a complicated detection head. This results in reduction of costs and the apparatus size.

What is claimed is:

1. A position detection apparatus comprising:

a round bar-shaped recording medium having a scale signal of a predetermined recording wavelength recorded over the entire outer circumferential surface of said recording medium and successively repeated in the longitudinal direction, and an origin signal of a greater recording wavelength than said scale signal recorded at a part of the outer circumference at least at one position in the longitudinal direction;

scale signal detection head that moves relatively in the longitudinal direction of said recording medium while maintaining a predetermined distance from the outer circumference of said recording medium and detects said scale signal; and an origin signal detection head that moves relatively in the longitudinal direction of said recording medium while maintaining a predetermined distance from the outer circumference which distance is greater than said distance from the outer circumference of said recording medium to said scale signal detection head and that detects said origin signal;

wherein said scale signal detection head is located at a position not facing said origin signal and said origin signal detection head is located at a position facing said origin signal recorded on said recording medium.

* * * * *

UNITED STATES PATENT AND TRADEMARK OFFICE
CERTIFICATE OF CORRECTION

PATENT NO.   : 6,145,214           Page 1 of 1
DATED        : November 14, 2000
INVENTOR(S)  : Tadahiko Shimano and Takamoto Yoshioka It is certified that error appears in the above-identified patent and that said Letters Patent is hereby corrected as shown below:

<u>Title page,</u>
Insert item:

-- [30] Foreign Application Priority Data

Mar. 31, 1998  [JP]  Japan ………………….. P10-087438 --

Signed and Sealed this

Twenty-fourth Day of September, 2002

*Attest:*

JAMES E. ROGAN
*Attesting Officer*   *Director of the United States Patent and Trademark Office*